(12) United States Patent
Janoska et al.

(10) Patent No.: US 6,539,024 B1
(45) Date of Patent: Mar. 25, 2003

(54) METHOD AND APPARATUS FOR DATA BUFFER MANAGEMENT IN A COMMUNICATIONS SWITCH

(75) Inventors: Mark William Janoska, Kanata (CA); Albert D. Heller, Carleton Place (CA); Hossain Pezeshki-Esfahani, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/277,361

(22) Filed: Mar. 26, 1999

(51) Int. Cl.[7] ............... H04L 12/28; H04L 12/56
(52) U.S. Cl. ............ 370/412; 370/429; 370/229; 370/413; 370/417; 709/235; 710/52; 710/53; 710/54; 710/56; 710/57
(58) Field of Search .................. 370/429, 412, 370/229, 236.1, 236.2, 233, 230, 235, 395.7, 395.71, 395.72, 413, 417; 709/213, 232, 235; 710/52, 53, 54, 56, 57

(56) References Cited

U.S. PATENT DOCUMENTS

| | | | | |
|---|---|---|---|---|
| 4,953,157 A | * | 8/1990 | Franklin et al. | 370/230 |
| 5,231,633 A | * | 7/1993 | Hluchyj et al. | 370/429 |
| 5,475,680 A | * | 12/1995 | Turner | 370/412 |
| 5,541,912 A | * | 7/1996 | Choudhury et al. | 370/412 |
| 5,864,539 A | * | 1/1999 | Yin | 370/236 |
| 6,141,323 A | * | 10/2000 | Rusu et al. | 370/236 |
| 6,219,728 B1 | * | 4/2001 | Yin | 710/52 |
| 6,388,993 B1 | * | 5/2002 | Shin et al. | 370/233 |
| 6,442,139 B1 | * | 8/2002 | Hosein | 370/236 |

* cited by examiner

*Primary Examiner*—Wellington Chin
*Assistant Examiner*—Chuong Ho

(57) ABSTRACT

A method and apparatus is for buffering data cells in a queuing element is presented. Each queuing element includes a partitioned buffer, where the partitioned buffer includes a plurality of partitions. Each of the partitions stores data cells received by the queuing element. Storage of the data cells into the partitions is accomplished by using an array of logical queues. Each logical queue of the array of logical queues maps data cells corresponding to that logical queue to a particular partition of the plurality of partitions. More than one logical queue may map data cells to a particular partition. Each partition may include a reserved portion, where each logical queue that maps to the partition may map a portion of its data cells to the reserved portion. The resources of the reserved portion to which a logical queue maps data cells are reserved to that specific logical queue and cannot be utilized by other logical queues. Each partition also includes a shared portion, where all of the logical queues that map to a partition are able to utilize the storage space included in the shared portion. Each logical queue includes a maximum size. Depth pointers corresponding to the logical queue and the partition are updated as data cells are enqueued to, and dequeued from, the logical queue.

18 Claims, 7 Drawing Sheets

Partition 102

Logical Queue (LQ) 62

METHOD AND APPARATUS FOR DATA BUFFER MANAGEMENT IN A COMMUNICATIONS SWITCH

TECHNICAL FIELD OF THE INVENTION

The invention relates generally to buffering of data and more particularly to a method and apparatus for buffering data cells in a communication switch.

BACKGROUND OF THE INVENTION

Data communication systems such as packet-based and cell-based communication systems send packets or cells of data through a network of switches. Each of the switches in the network is typically capable of receiving input data from a number of different sources and providing this input data to a number of different outputs. In doing so, the switch must be capable of buffering received data until it is possible to provide the data to the appropriate output via a data stream of limited bandwidth. In performing such buffering operations, prioritization schemes may be implemented in the buffers such that different classes of service can exist within the communications network. These prioritization schemes control the flow of buffered data into the limited bandwidth output stream.

In order to implement different prioritization schemes, it is desirable to monitor data waiting to be provided to an output of the communication switch, where the monitoring includes differentiation between data of varying levels of priority. In addition to priority, the input, or source, from which the data was received and the destination of the data may be monitored and taken into account when selecting data for output. Such prioritization based on input, output, and level of priority should be flexible in that as the needs of the communication system change, the prioritization scheme should be adaptable to suit the changing needs of the system.

Another consideration that should be addressed by buffering circuitry in a communication switch is the efficient use of available memory. As such, data having different levels of priority or data of other varying characteristics should have a controlled amount of storage space within the buffer. The buffer should also be able to accommodate the varying needs of the different data priority levels in terms of varied rates of data received. In other words, if a large amount of data having a specific priority level is received in sporadic large bursts, the buffering circuitry should be able to accommodate these large bursts. In order to accommodate these large bursts, prior art systems were required to include worst-case sized buffers capable of supporting these data bursts. Because these data burst may be infrequent, providing large buffer space to accommodate an occasional burst is inefficient use of buffer resources. This requires larger amounts of memory to be included within the communication switch, and thus increases cost and complexity of the switches and the overall communication system.

Therefore, a need exists for a method and apparatus for buffering data cells in a communication switch that supports varying priority levels, where the use of a limited amount of buffering memory is efficient but able to accommodate occasional large bursts of data.

DETAILED DESCRIPTION OF A PREFERRED EMBODIMENT OF THE INVENTION

Figure 1:
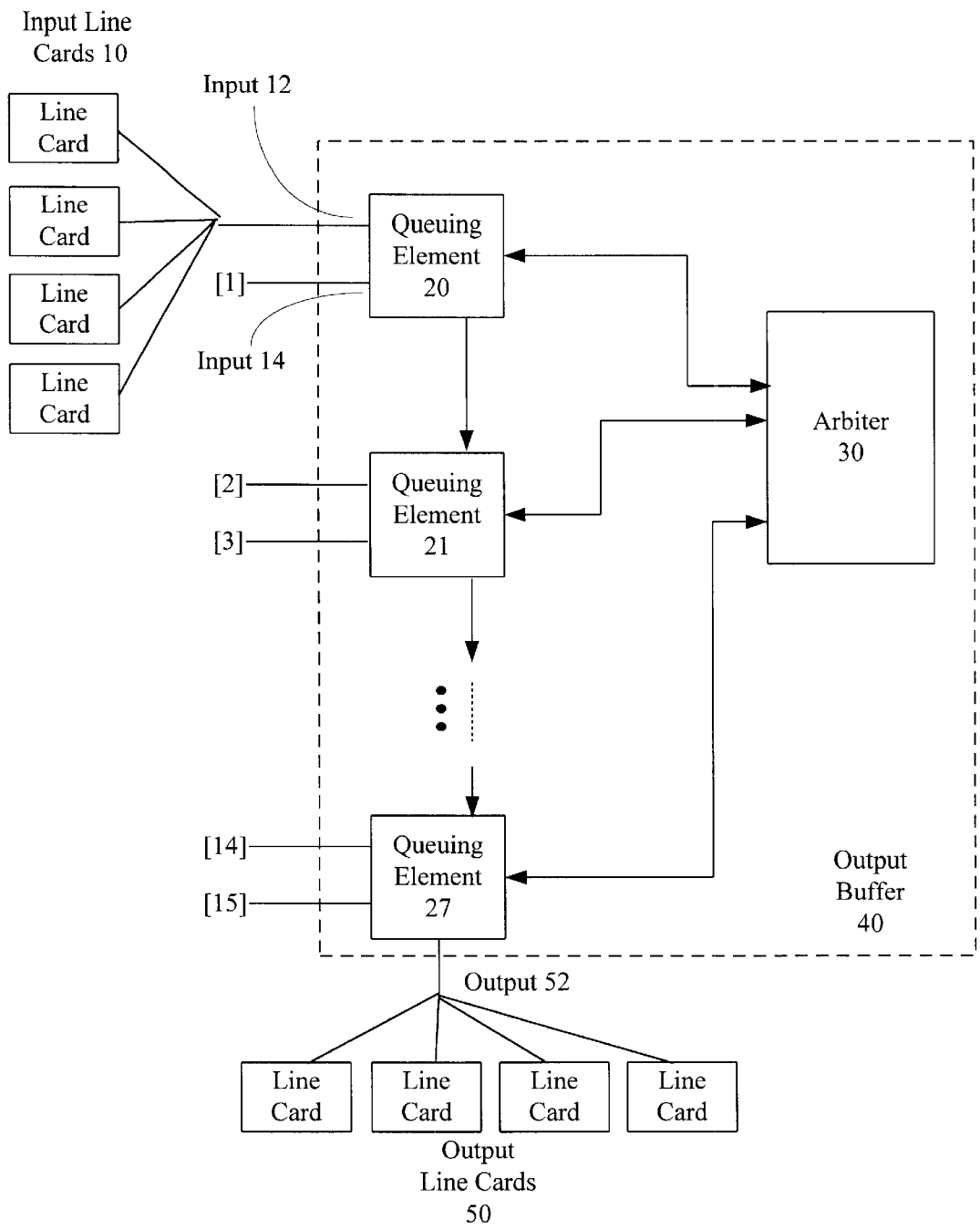
FIG. 1 illustrates a block diagram of an output buffer within a communication switch in accordance with the present invention.

Generally, the present invention provides a method and apparatus for buffering data cells in a queuing element included in the output buffer of a data communication switch. Each queuing element includes a partitioned buffer, where the partitioned buffer includes a plurality of partitions. Each of the partitions stores data cells received by the queuing element. Storage of the data cells into the partitions is accomplished by using an array of logical queues. Each logical queue of the array of logical queues maps data cells corresponding to that logical queue to a particular partition of the plurality of partitions. More than one logical queue may map data cells to a particular partition. Each partition may include a reserved portion, where each logical queue that maps to the partition may map a portion of its data cells to the reserved portion. The resources of the reserved portion to which a logical queue maps data cells are reserved to that specific logical queue and cannot be utilized by other logical queues. Each partition also includes a shared portion, where all of the logical queues that map to a partition are able to utilize the storage space included in the shared portion. Each logical queue includes a maximum size.

When the queuing element receives a data cell, it determines to which logical queue the data cell corresponds. This determination is based on information included in the data cell. The logical queue is then examined to determine whether or not there is adequate space within the logical queue for the received data cell. If so, the partition to which the logical queue maps is examined to insure that there is space available within the partition. If space is available, the data cell is enqueued in the logical queue such that it is stored within the partition. Depth pointers corresponding to the logical queue and the partition are then updated to indicate that another data cell has been enqueued. When data is fetched from, or dequeued, from the logical queue, these pointers are updated to reflect the removal of the data cell.

Because a number of logical queues may utilize the same partition within the buffer, the shared portion of the partition may provide a large amount of shared buffering resources that enable the individual logical queues to have adequate buffering capabilities when presented with a large burst of data. However, in order to avoid having one or more logical queues consume all of the resources of a particular partition, each logical queue may reserve a certain portion of the partition that cannot be used by other logical queues utilizing the partition. Because all of the logical queue configurations and the partitioning of the buffer are fully configurable, the buffering method and apparatus described herein is flexible and can be adapted to suit the needs of a variety of different applications. This can include configuring the array of logical queues to support different prioritization schemes typically associated with classes of service in packet- or cell-based communication networks.

The invention can be better understood with reference to FIGS. 1–10. FIG. 1 illustrates an output buffer 40 operably coupled to a plurality of input line cards 10 and a plurality of output line cards 50. The output buffer is preferably included in the switch core of a communication switch, where the communication switch is preferably used in a cell-based network or a packet-based network such as an asynchronous transfer mode (ATM) network. The output buffer 40 receives data cells, or data packets, from the input line cards 10 and provides the data cells to an output 52 that is provided to one or more of the output line cards 50. Note that the output buffer 40 includes a plurality of queuing elements 20–27, where each queuing element receives data cells from a different set of line card inputs. Thus, the output buffer 40 will typically receive data cells from a large number of line cards to be directed to a more limited set of output line cards.

Each queuing element of the output buffer 40 is shown to receive data sets over two inputs. The queuing element 20 includes an input 12 which is coupled to the input line cards 10, whereas the input 14 will receive data cells from another group of line cards. In an example embodiment, the input 12 receives data cells from four line cards, and the input 14 receives data receives data cells from four additional line cards. It should be obvious to one of ordinary skill in the art that the number of line cards coupled to each queuing element can vary and should be based on the application in which the buffering system is utilized.

Each of the queuing elements 20–27 buffers the data cells its receives from its respective sets of line cards until instructed by the arbiter 30 to include one or more of the data cells in a data stream. The data stream, or portions thereof, is provided as the output 52 to one or more of the output line cards 50. In the example illustrated, the output 52 is provided to one or more of four output line cards 50. The queuing elements 20–27 of FIG. 1 are shown to be intercoupled in a daisy chained structure, however, the queuing elements may be intercoupled in a variety of different manners to generate the output data stream. The daisy-chained implementation illustrated in FIG. 1 is the subject of a copending patent application filed on Mar. 24, 1999, and having a serial number of XXXXXX.

The data cells received by the queuing elements of the output buffer 40 may be of varying levels of priority, where the levels of priority may be associated with different classes of service in the communication network. For example, in an ATM network, the potential classes of service include constant bit rate (CBR), real-time variable bit rate (rt-VBR), non-real-time variable bit rate (nrt-VBR), available bit rate (ABR), and unspecified bit rate (UBR). Each of these different service categories provides a different quality of service that may be desirable to various users of the communications network. Because of the varying levels of quality of service, the output buffer 40 may give preferential treatment to data cells corresponding to certain service categories. For example, CBR data cells may be preferentially passed over all other data cells, whereas UBR data cells may only be passed when data cells of other service categories are not enqueued in a queuing element of the output buffer.

Figure 2:
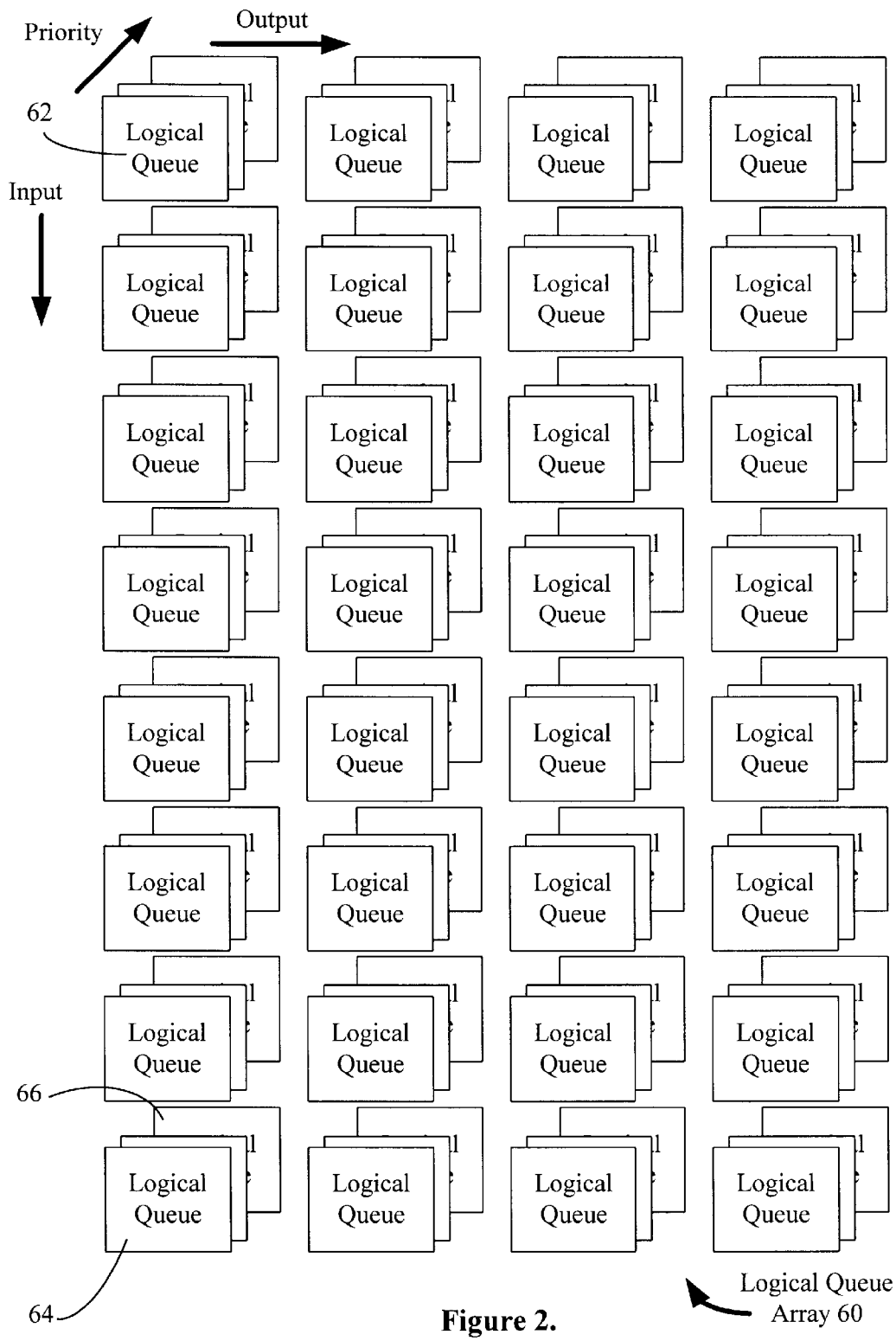
FIG. 2 illustrates a block diagram of a logical queue array in accordance with the present invention.

In order to facilitate a flexible prioritization scheme, an array of logical queues is utilized to map received data cells to the limited buffering space within each of the queuing elements. FIG. 2 illustrates a logical queue array 60 that includes 256 logical queues. The logical queue array 60 illustrated in FIG. 2 is four logical queues in width, 8 logical queues in height, and 8 logical queues in depth. The example logical queue array 60 illustrated in FIG. 2 corresponds to the output buffer 40 and the line cards to which it is coupled.

As described in the example earlier, if the output 52 of the output buffer 50 can be provided to one or more of four output line cards 50, the horizontal dimension of the logical queue array 60 may correspond to the output line cards. As such, all logical queues in the first column of the logical queue array will correspond to data cells which are to be provided to the first output line card. Similarly, all data cells enqueued in a logical queue in the fourth column will correspond to the fourth output line card.

Similarly, if a particular queuing element receives data cells from two inputs, where each input is coupled to four line cards, the vertical dimension of the logical queue array 60 may correspond to these eight inputs. Thus, data cells in the first row of the logical queue array will correspond to data cells received from the first input line card, and data cells enqueued in a line card in the fifth row will correspond to data cells received from the fifth line card.

The depth of the logical queue array 60 may be utilized to indicate priority of data cells in terms of preferential treatment by the arbiter 30. Thus, the top plane of logical queues may correspond to data cells having a highest level of priority, whereas the back plane of logical queues may correspond to data cells having a lowest level of priority.

In an example embodiment where the logical queue array 60 is utilized in a queuing element 20 of an output buffer 40 which is part of a switch core in an ATM communication switch, the varying priority levels may be associated with ATM service categories. Thus, the top plane of logical queues in the logical queue array 60 may be associated with CBR data cells, whereas the backmost plain in the logical queue array 60 is associated with UBR data cells. Thus, the logic queue 62 which is in the first column and first row of the top plain would include CBR data cells received from the first line card input to the queuing element 20. The data cells in the logical queue 62 would be directed to the first output line card, and the priority level associated with the logical queue 62 would be that associated with CBR data cells. Similarly, the logical queue 64 would include data cells received from the eighth line card input to the queuing element 20, directed at the first output line card, and having a priority level associated with a CBR data cell. The data cells in the logical queue 66 would be UBR data cells received from the eighth line card input, directed at the first line card output, and having a priority level associated with UBR data cells.

Figure 3:
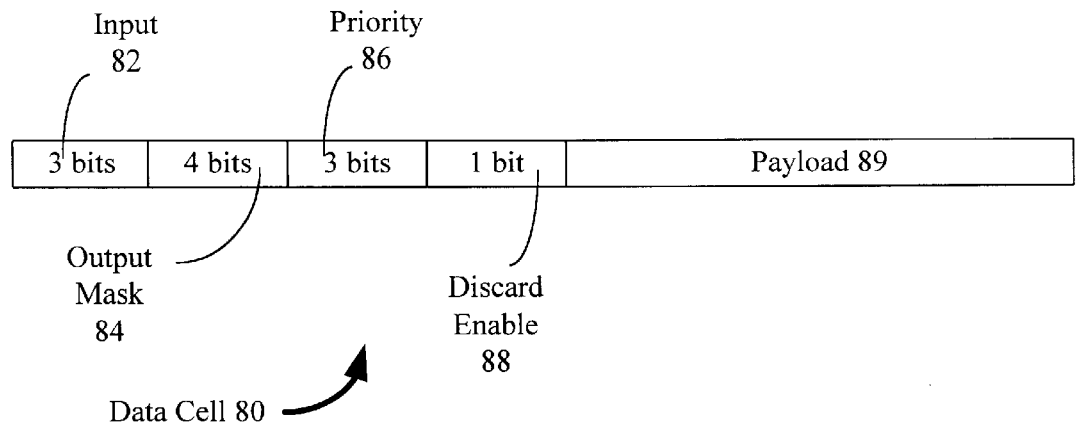
FIG. 3 illustrates a block diagram of a data cell in accordance with the present invention.

In order to determine to which of the logical queues in the logical queue array 60 a particular received data cell corresponds, each data cell includes information that selects a particular logical queue. FIG. 3 illustrates an example data cell 80 that includes a payload portion 89, and a number of bit fields that determine how and if a data cell is buffered in a particular queuing element. The bit fields include an input field 82 where the input bit field indicates the source of the data cell. In the example illustrated in FIG. 1, the input bit field may include the three bits such that the three bits will distinguish between the eight potential line card inputs to the queuing element.

The second bit field is the output mask bit field 84, where the output mask bit field determines to which of the output line cards the data cell is to be routed. Preferably, the output mask bit field includes one bit for each of the potential line card outputs such that the data cell may be provided to one or more of the line cards in any possible combination. Thus, if the first and fourth bits of the output mask bit field 84 are set to a valid state, the data cell may be provided to the first and fourth output line cards.

The third bit field included in the data cell 80 is the priority bit field 86. Preferably, the priority bit field 86 determines to which plane of logical queues in the logical queue array the data corresponds. Thus, in the example logical queue array of FIG. 2, the priority bit field may include three bits such that one of eight different logical queue planes can be encoded.

An additional bit field that may be included in the data cell 80 is the discard enable bit field 88. The discard enable field, which may be one or more bits, may contain an indication as to whether the data cell should be buffered or discarded in the case where congestion exists within the queuing element. The use of this discard enable bit field 88 will be discussed with respect to FIGS. 5–9 below.

Figure 4:
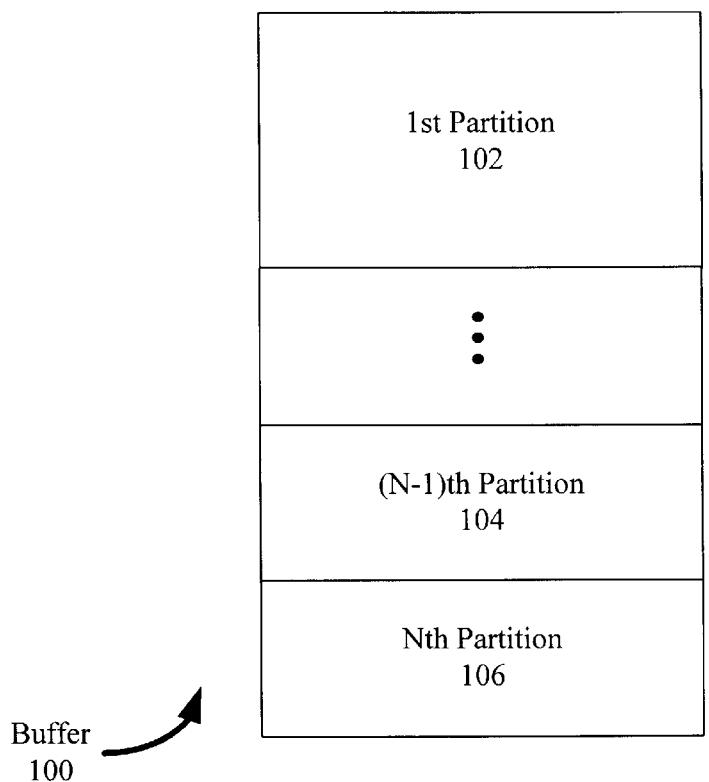
FIG. 4 illustrates a partitioned buffer in accordance with the present invention.

Each of the logical queues of the logical queue array 60 maps data cells corresponding to that logical queue to the buffer included in each of the queuing elements. FIG. 4 illustrates a buffer 100 that may be included in each of the queuing elements 20–27 of the output buffer 40. The buffer 100 is of limited size, and in one embodiment includes 64K cells. The buffer 100 is divided into a number of different partitions, where the partitions are not necessarily blocks of memory within the buffer, but may be cells located at various locations within the buffer 100. These cells in varying locations are associated through the use of a linked list or other structure to form various partitions within the buffer 100. The buffer 100 is shown to include N partitions, where N can be any number, but is preferably a power of two such that the identity of the partitions can be conveniently encoded using the binary number system. In one embodiment, N is equal to 32 such that 32 partitions exist within the buffer 100. Each of the partitions is of varying size, and the first partition 102 may make up a large portion of the buffer 100 whereas the (N−1)th partition 104 and the Nth partition 106 may much smaller than the first partition 102.

Each of the logical queues in the logical queue array 60 maps to one of the partitions within the buffer 100. Any number of logical queues may map to a single partition within the buffer 100. However, a logical queue only maps to one of the partitions. Thus, data cells associated with different logical queues may be co-mingled within a particular partition. Returning to the example discussed earlier, the CBR data cells associated with the logical queues 62 and 64 of FIG. 2 may be mapped to the first partition 102.

Figure 5:
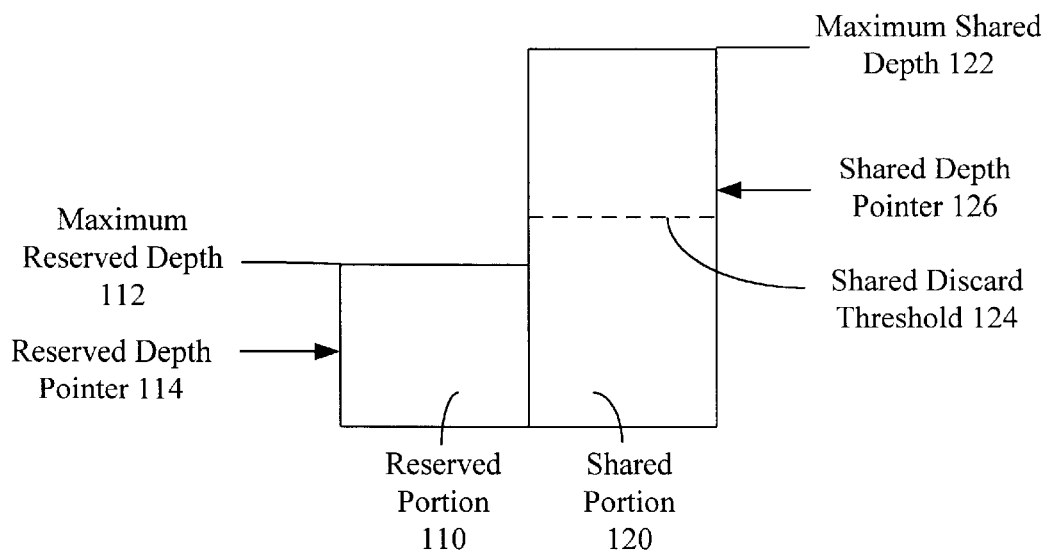
FIG. 5 illustrates a block diagram of a partition in accordance with the present invention.

In order to facilitate efficient use of the memory cells available in the partitions, each partition is characterized by a number of parameters that constrain the use of the partition by the logical queues that map data cells to the particular partition. FIG. 5 illustrates a block diagram of a partition and the associated parameters that describe the partition. The partition 102 is divided into a reserved portion 110 and a shared portion 120. The reserve portion 110 may be eliminated such that the entire partition is made up of the shared portion 120. The total size in terms of storage capacity of the partition 102 is the sum of the maximum shared depth 122 and the maximum reserved depth 112.

The reserved portion 110 of the partition 102 indicates the portion of the partition that is relegated to individual logical queues that map to the particular partition. Thus, portions of the reserved portion 110 will be allocated to a particular logical queue such that only that logical queue can utilize that particular amount of storage capacity within the reserved portion 110. Once a logical queue has exhausted its portion of the reserved portion 110, it can begin to store data cells utilizing the shared portion 120 of the partition 102. Preferably, the utilization of the reserved portion 110 of the partition 102 is monitored via the reserved depth pointer 114. The reserved depth pointer 114 is incremented each time a logical queue stores a data cell in its allocated reserved space within the reserved portion 110. Similarly, each time a data cell is removed from the reserved portion 110, the reserve depth pointer is decremented to reflect the newly vacant location.

The shared portion 120 of the partition 102 is characterized by a maximum shared depth 122 that indicates the total amount of shared resources available within the partition 102. A shared depth pointer 126 monitors the level of usage of these resources, and is incremented when data cells are stored within the shared portion 120 and decremented when the data cells are removed from the shared portion 120.

As stated earlier, the shared portion 120 is used by all of the logical queues that map to the partition 102. As such, the shared portion 120 provides a large buffering resource that may be used by any one of the logical queues to store large amounts of data that exceed the reserved capacity of the logical queue. Thus, the shared portion 120 provides a shared resource that encourages more efficient use of buffering resources as it is available to a number of different logical queues. This sharing of the partition resources may be tempered by the presence of some reserved portion 110, where the reserved portion 110 provides some level of isolation between the logical queues that utilize a particular partition. This insures that one or more logical queues cannot monopolize the resources of a particular partition. As stated earlier, it is emphasized that the reserved portion of a partition is optional, and the entire resource base of the partition may be shared amongst all of the logical queues corresponding to the partition.

Shared portion 120 of the partition 102 may also include a shared discard threshold 124. The shared discard threshold 124 may be compared with the shared depth pointer 126 to determine whether or not congestion exists within a particular partition. If the shared discard threshold 124 is exceeded by the shared depth pointer, this may indicate that the shared resources of the partition 102 are being utilized to the point where the shared resources are becoming scarce. In the case where the shared discard threshold 124 is exceed, it may be determined that certain data cells should be discarded rather than stored within the dwindling resources of the shared partition 120. These data cells may be identified the discard enable bit field 88 described with respect to FIG. 3. Thus, if the data cell is received that has its discard enable bit set and the shared discard threshold 124 of the partition 102 has been exceed by the shared depth pointer 126, the data cell may be discarded rather than stored. However, if the discard enable field within the data cell is not set, the cell will consume some of the dwindling shared resources and be stored within the partition 102. Note that the shared discard threshold 124 may be set based on the particular application in which the buffering system is being utilized. Thus, in some partitions, the shared discard threshold 124 may be set to a higher level than in other partitions that are more discriminatory towards discard enabled data cells.

Figure 6:
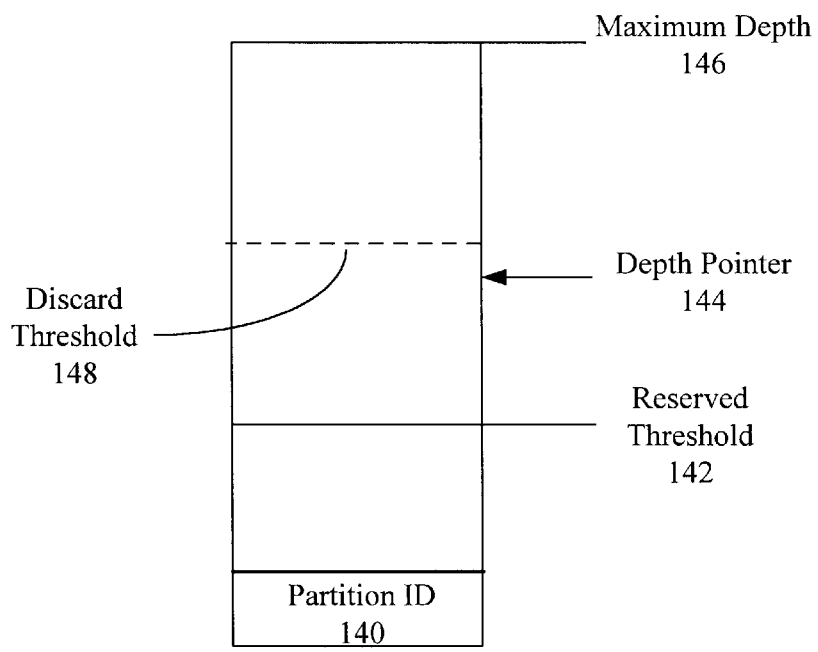
FIG. 6 illustrates a block diagram of a logical queue in accordance with the present invention.

FIG. 6 illustrates a block diagram of a logical queue (LQ) 62 and its associated parameters. Logical queue 62 is characterized by a maximum depth 146 that indicates the maximum number of data cells that can be enqueued in the logical queue 62. The logical queue 62 also includes a partition identifier (ID) 140 that determines to which partition in the buffer 100 the logical queue 62 maps its data cells. A depth pointer 144 monitors the number of data cells enqueued in a particular logical queue. As with the partition pointers, the depth pointer 144 is incremented each time a data cell is enqueued in the logical queue 62, and decremented each time a data cell is dequeued from the logical queue 62. A reserved threshold 142 indicates the amount of partition resources reserved for exclusive use by the logical queue 62. The reserved threshold 142 can be compared with the depth pointer 144 to determine whether or not the logical queue should store a data cell in the reserved portion 110 of the partition 102, or in the shared portion 120. Note that data cells are preferentially stored in the reserved portion of the partition, and the shared portion of the partition is not utilized until the allocation to a particular logical queue within the reserved portion has been filled.

The logical queue 62 may also include a discard threshold 148 that corresponds to the depth at which the logical queue 62 may begin to discard cells that are discard enabled. Thus, if the logical queue has been filled such that the depth pointer 144 exceeds the discard threshold 148, the discard enable bit of received data cells provided to the logical queue 62 will be examined to determine whether or not the particular data cell is discard enabled. If the cell is discard enabled, it will be discarded rather than stored within the logical queue, thus avoiding further congestion. However, if the discard enable field of the data cell indicates that it is not discard-eligible or enabled, the logical queue will enqueue the data cell.

Figure 7:
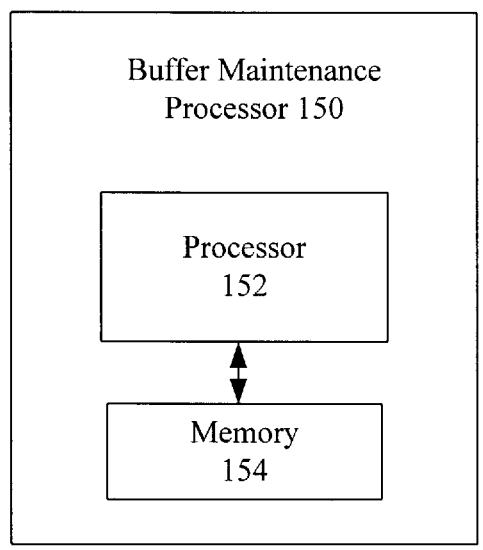
FIG. 7 illustrates a block diagram of a buffer maintenance processor in accordance with the present invention.

FIG. 7 illustrates a block diagram of a buffer maintenance processor 150 that may be utilized to oversee the enqueuing and dequeuing of data cells into the logical queue array within a queuing element. The buffer maintenance processor 150 includes a processor 152 and memory 154. The processor 152 may include a single processing entity or a plurality of processing entities. Such a processing entity may be a microprocessor, microcontroller, digital signal processor, state machine, logic circuitry, and/or any device that processes information based on operational and/or programming instructions. The memory 154 may be a single memory device or a plurality of memory devices. Such a memory device may be a read-only memory device, random access memory device, floppy disk, hard drive memory, and/or any device that stored digital information. Note that the processor 152 may have one or more of its functions performed by a state machine and/or some combination of logic circuitry. In such an instance, the memory containing the corresponding operational instructions is effectively embedded within the state machine and/or logic circuitry such that a physically separate memory device may not be present.

Figure 10:
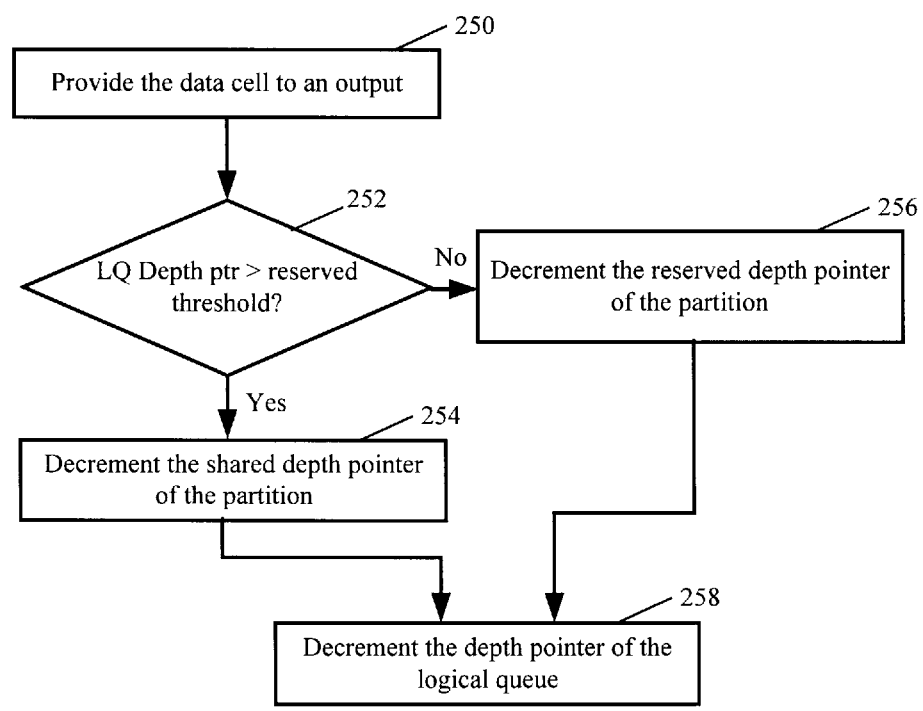
FIG. 10 illustrates a flow diagram of a method for dequeuing, or removing, data cells from a buffer in accordance with the present invention.
Figure 8:
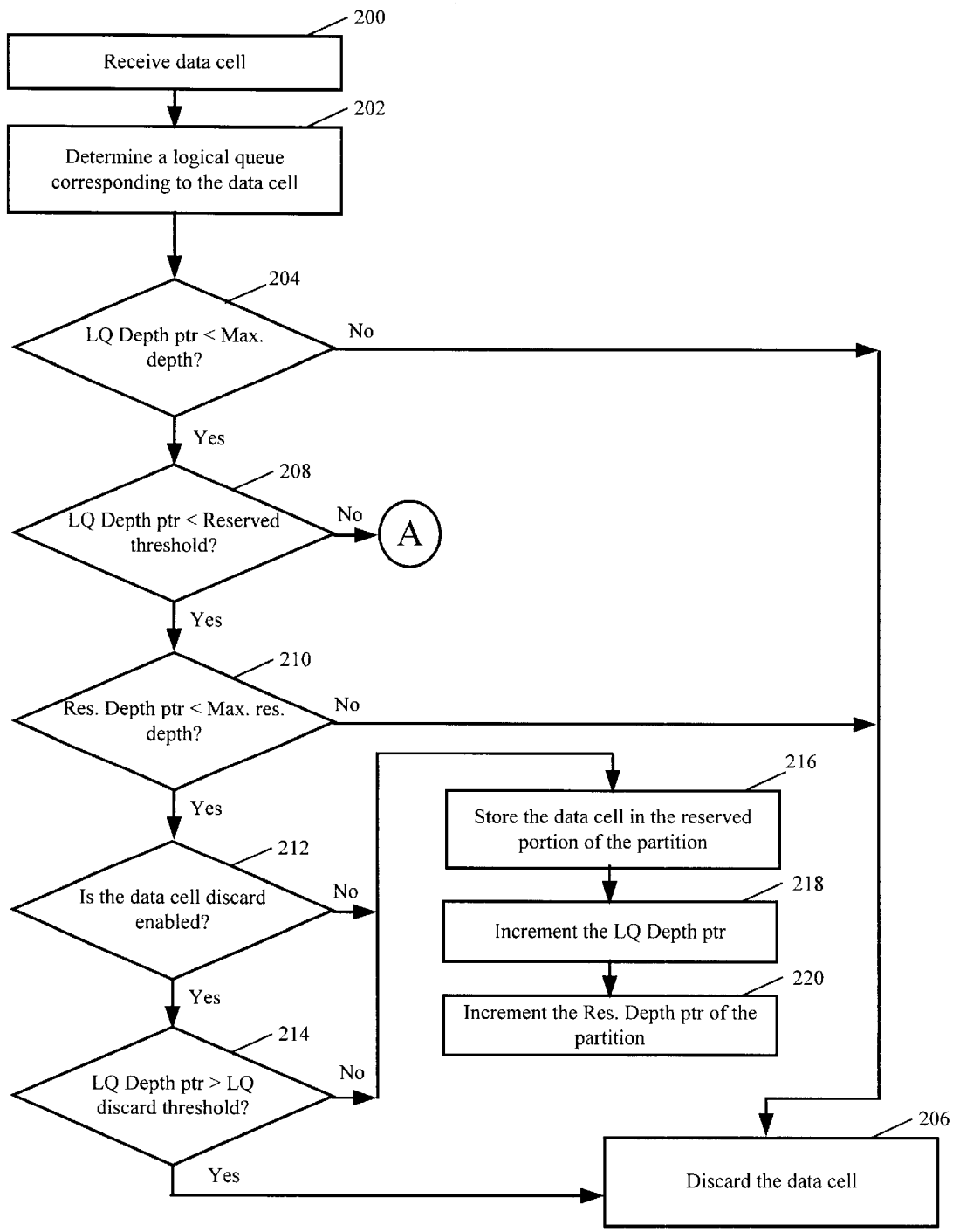
FIG. 8 illustrates a first portion of a flow diagram of a method for buffering data cells in accordance with the present invention.
Figure 9:
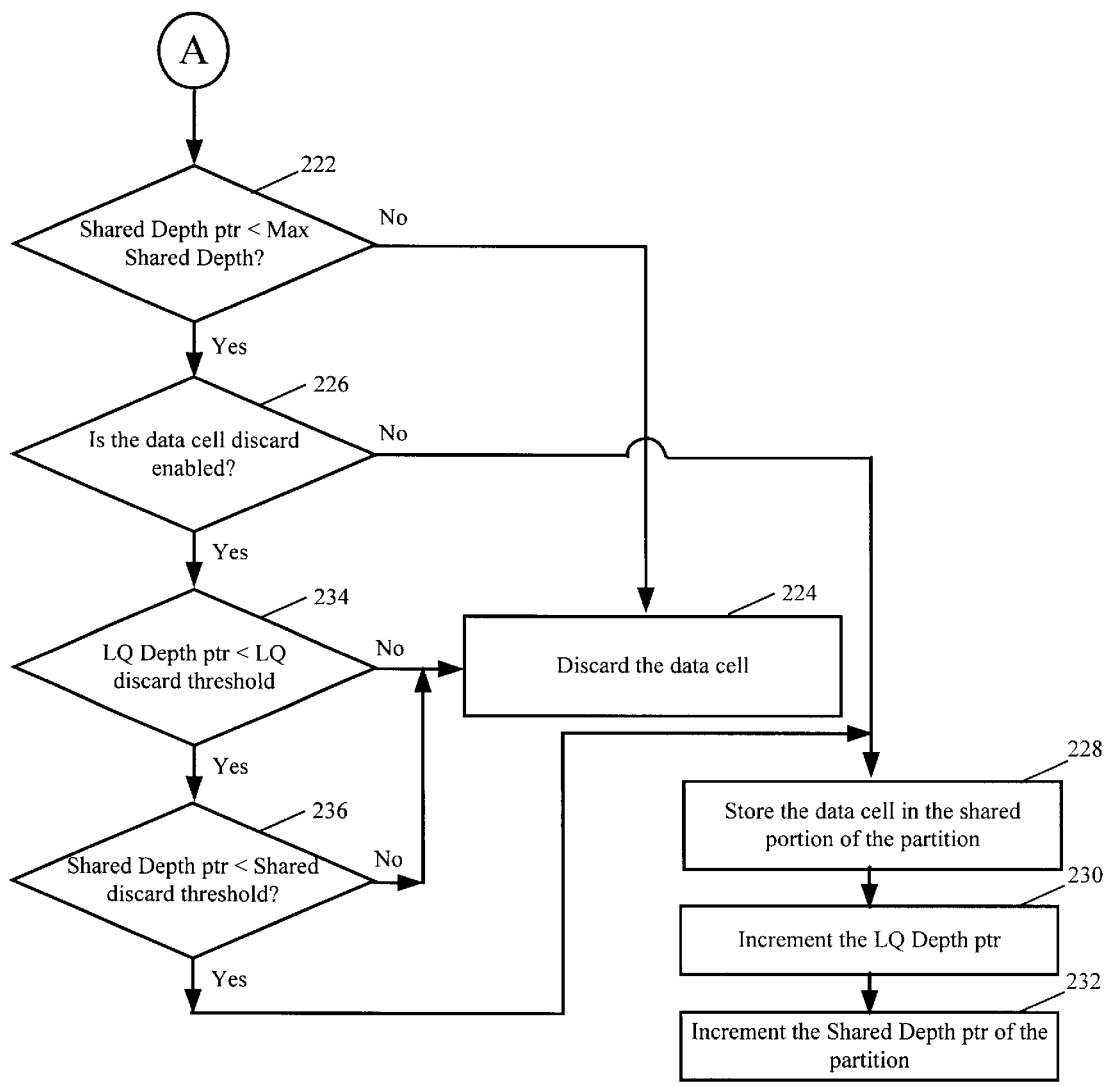
FIG. 9 illustrates a second portion of the flow diagram of a method for buffering data cells in accordance with the present invention.

The memory 154 stores programming and/or operation instructions that allow the processor 152 to perform the methods illustrated in FIGS. 8–10 corresponding to enqueuing and dequeuing data cells from the logical queues. FIGS. 8 and 9 illustrate a method for enqueuing a data cell into a logical queue associated with the data cell. At step 200, a data cell is received. Preferably, the data cell is received by a queuing element within an output buffer of a switch core within a communication switch.

At step 202, a logical queue corresponding to the received data cell is selected from a plurality of logical queues. The selection or determination of the appropriate logical queue is based on information included in the data cell, and preferably is based on the bit fields discussed earlier with respect to FIG. 3. Preferably, the plurality of logical queues from which the logical queue corresponding to the data cell is selected is arranged in an array structure as was illustrated in FIG. 2. More preferably, the various dimensions of the array are relevant to the type of data cells stored within a particular logical queue.

At step 204, it is determined if a depth pointer of the logical queue is less than a maximum depth corresponding to the logical queue. If it is determined that the depth pointer is not less than the maximum depth, the method proceeds to step 206 where the data cell is discarded. When a data cell is discarded, some partition discard statistics may be updated such that the overall performance of the output buffer or logical queue structure within the queuing element can be monitored to determine the level of discards taking place. This then can be used to notify other entities of network congestion levels.

If it is determined at step 204 that the depth pointer of the logical queue is less than the maximum depth, indicating that there is space remaining in the logical queue, the method proceeds to step 208. At step 208, it is determined if the depth pointer of the logical queue exceeds a reserved threshold. As described earlier with respect to FIG. 6, the reserved threshold indicates the portion of a partition that is reserved to a particular logical queue. Thus, if the depth pointer for the logical queue is below the reserved threshold, this indicates that there should be reserved space remaining in the partition corresponding to the logical queue for this particular data cell. If it is determined that the depth pointer does not exceed the reserve threshold, the method proceeds to step 210.

At step 210, it is determined if a reserved depth pointer of the partition is less than a maximum reserved depth. Thus, although the reserve allocation for this particular logical queue may not be filled, there may have been some error in setting up the reserved portion of the partition. The check performed at step 210 insures that the reserved portion of the logical queue has not been over-filled. If it is determined that the reserved depth pointer exceeds the maximum reserved depth, the method proceeds to step 206 where the data cell is discarded.

If it is determined that there is still space remaining in the reserved portion of the partition, the method proceeds to step 212. At step 212, it is determined if the data cell is discard enabled. This determination may be based on a bit or bit field included in the data cell. If it is determined that the data cell is discard enabled at step 212, the method proceeds to step 214. At step 214, it is determined if the depth pointer of the logical queue exceeds a discard threshold of the logical queue. The discard threshold of the logical queue indicates whether or not the logical queue is experiencing some level of congestion. The discard threshold is configurable, and thus may be set to whatever level is appropriate for the particular logical queue. If it is determined that the logical queue is in a state of congestion, and the data cell is discard enabled, the method will proceed from step 214 to step 206 where the data cell is discarded. If it is determined at step 214 that the discard threshold of the logical queue has not yet been reached, the method proceeds to step 216.

Thus, if the data cell is not discard enabled, or if the discard threshold has not been reached, the data cell will be enqueued into the logical queue. This takes place at steps 216, 218, and 220. At step 216, the data cell is stored in the reserved portion of the partition. As was stated earlier, the logical queue will utilize its allocation in the reserved portion of the partition prior to utilizing resources in the shared portion of the partition.

At step 218, the depth pointer of the logical queue is incremented to reflect the fact that an additional data cell has been enqueued into the logical queue. At step 220, the reserve depth pointer of the partition is incremented, thus reflecting that the data cell has been stored in the reserved portion of the partition.

Returning to step 208, if it is determined that the depth pointer of the logical queue is greater than the reserved threshold of the logical queue, the method proceeds to step 222, which is illustrated in FIG. 9. At this point, it is understood that the allocation of the reserved portion of the partition to the logical queue has been completely consumed by the logical queue, and it must be determined if the shared resources in the partition can be utilized to store the data cell. At step 222, it is determined if the shared depth pointer of the partition is less than a maximum shared depth. This determines whether or not there is still some space remaining in the shared resources. If it is determined that the maximum shared depth has been reached such that the shared portion of the partition is full, the method proceeds to step 224 where the data cell is discarded. As was described with respect to step 206, some partition discard statistics may be updated such that overall performance of the buffering system may be monitored.

If it is determined at step 222 that space remains within the shared resources, the method proceeds to step 226. At step 226, it is determined if the data cell is discard enabled. If the data cell is not discard enabled, the method will proceed to steps 228, 230, and 232 where the data cell will be enqueued. However, if the data cell is discard enabled, the method proceeds to step 234.

At step 234, it is determined if the depth pointer of the logical queue exceeds a discard threshold of the logical queue. Thus, the logical queue is examined to determine if it has reached the level of congestion set by the discard threshold. If the level of congestion has been reached, the data cell will be discarded at step 224. If the discard threshold of the logical queue has not yet been reached, the method proceeds to step 236.

At step 236, it is determined if the shared depth pointer of the partition exceeds a shared discard threshold of the partition. Thus, the shared portion of the partition also includes a depth pointer that indicates the number of data cells that have been stored within the shared portion. If this shared depth pointer exceeds a shared discard threshold, indicating that the partition is experiencing some level of congestion, the data cell will also be discarded at step 224. Therefore, an enabled data cell may be discarded if congestion exists in either the logical queue or the shared portion of the partition. If it is determined at step 236 that the shared discard level of the shared portion of the partition has not been exceed, the method proceeds to steps 228, 230, and 232 for enqueuing of the data cell.

At step 238, the data cell is stored in the shared portion of the partition. At step 230, the depth pointer of the logical queue is incremented, and at step 232, the shared depth pointer of the partition is incremented.

The method illustrated by the flow diagram of FIGS. 8 and 9 illustrates enqueuing of data cells into the logical queue structure described with respect to the earlier Figures. The flow diagram of FIG. 10 illustrates the method utilized to dequeue the data cells from the queuing structure such that they may be provided to the output of the output buffer. The method begins at step 250 where a data cell is provided to the output of the output buffer. The dequeuing or outputting of a data cell may be based on arbitration information received from an arbiter included in the output buffer. As stated earlier, the arbitration performed by the arbiter may be based on differing priority levels that are reflected in the mapping of data cells to the differing logical queues included in the logical queue array.

At step 252, it is determined if the depth pointer of the logical queue is greater than the reserved threshold of the logical queue. Thus, it is determined whether or not the reserved allocation of the logical queue in the reserved portion of the partition is full or not. If it is determined at step 252 that the depth pointer does exceed the reserved threshold, which indicates that shared resources are being utilized, the shared depth pointer of the partition is decremented. Thus, if a data cell of the logical queue that is utilizing shared resources is dequeued, the shared depth pointer should be decremented reflecting that a shared resource has been freed up. This is because the last resources to be freed up by a particular logical queue will be the resources reserved for that logical queue in the reserved portion of the partition. Once again, it should be noted that a partition may be entirely shared such that a reserved portion does not exist. If a reserved portion does not exist in the partition, the steps involving the reserved portion of the partition, or the reserved threshold in the logical queue should be ignored accordingly.

If it is determined at step 252 that the depth pointer is below the reserved threshold, this indicates that the dequeuing of the data cell will free up at portion of the reserved allocation corresponding to the logical queue. Thus, at step 256, the reserved depth pointer of the partition is decremented. At step 258, the depth pointer of the logical queue is decremented, reflecting the fact that a data cell in the logical queue has been dequeued, thus reducing the total number of data cells queued by the logical queue.

The method and apparatus presented herein describe a technique for buffering data cells received in a communication switch that may be applicable to other applications. By including a flexible set of logical queues that are fully configurable and are mapped to a plurality of partitions which are also fully configurable, a very flexible buffering system is created. The advantages of the buffering system are furthered by the differentiation between shared and reserved resources within a partition. The shared resources increase the efficiency of memory or buffer space usage within the buffering system by allowing each individual logical queue to have access to larger buffering resources than could be practically provided if the resources were not shared. This sharing is tempered by the reserved portion of the partition, where the reserved portion guarantees that a particular logical queue can be allocated a certain level of resources for buffering purposes.

It should be noted that the differentiation between a shared portion and a reserved portion in the partition may be expanded such that there are different levels of reservation in the partition. Thus, a partition may include a set of shared resources that are used freely by each of the logical queues that map to that partition. The partition may also include a first level of reserved allocation that is only utilized by a subset of the logical queues that map to the partition, but this subset of logical queues uses the first level of reserved resources as if it were shared resources amongst that group of logical queues. A second level of reserved resources may then be included that are specifically allocated to individual logical queues. Thus, differing levels of sharing may be nested in the partitions. It should be obvious to one of ordinary skill in the art that the number of levels of sharing can be varied to suit the particular application.

A descriptive example of utilization of the buffering technique is provided to help illustrate the utility of the buffering technique in an ATM switch. In the descriptive example, the buffer is partitioned into eight partitions. The first four partitions are dedicated to CBR traffic such that all of the logical queues that map to the first four partitions store CBR data cells in these partitions. Within these partitions, some amount of shared resources exist such that when a particular logical queue receives a large number of CBR data cells that correspond to a particular output, buffering capabilities will exist so the CBR data cells will not be discarded. As CBR data is associated with a high quality of service, insuring that data cells are not discarded is important to maintaining the service quality. Each of the first four partitions maybe dedicated to one particular output line card to which the output buffer provides data cells. Thus, the first partition may provide outputs to a first line card, the second to a second line card, etc. The priority level of the first four partitions will be of top priority as CBR is typically associated with the highest priority service category.

The fifth partition of the buffer may be dedicated to UBR traffic, which has the lowest priority amongst classes of service. Thus, the logical queues corresponding to the fifth partition may be located on a plane that reflects their low priority level. The partition dedicated to UBR traffic may be set up such that it does not include any reserved portion. With no reserved portion, the UBR traffic is dealt with on a first come first serve basis. When the resources of the partition have been filled, data cells will be discarded. This reflects the quality of service typically provided with UBR traffic in that there is no guarantee that data cells will get through to their destination.

The remaining three partitions of the buffer may be dedicated to ABR traffic, and as was the case with respect to UBR traffic, it may be that reserved portions are not included within these partitions. As such, the reserved depth pointer and reserved maximum depth are irrelevant with respect to the methods illustrated in FIGS. 8–10 with respect to these partitions. The priority level of ABR is less than that of CBR, but greater than that of UBR, so preferably, the logical queues that map to the partitions dedicated to ABR will be located within the logical queue array such that their associated priority in the logical queue array is greater than that of the logical queues associated with the UBR traffic.

It should be understood that the implementation of other variations and modifications of the invention in its various aspects should be apparent to those of ordinary skill in the art, and that the invention is not limited to the specific embodiments described. It is therefore contemplated to cover by the present invention, any and all modifications, variations, or equivalents that fall within the spirit and scope of the basic underlying principles disclosed and claimed herein.

What is claimed is:

1. A method for buffering data cells comprising:
   (a) receiving a data cell;
   (b) determining a logical queue corresponding to the data cell from a plurality of logical queues, wherein determining the logical queue is based on information in the data cell, wherein the logical queue is used to store data in a partition of a partitioned buffer;
   (c) determining if a depth pointer of the logical queue is less than a maximum depth;
   (d) when the depth pointer of the logical queue is not less than the maximum depth, discarding the data cell;
   (e) when the depth pointer of the logical queue is less than the maximum depth;
   (f) determining if the depth pointer of the logical queue exceeds a reserved threshold;
   (g) when the depth pointer does not exceed the reserved threshold:
      storing the data cell in a reserved portion of the partition; and incrementing the depth pointer of the logical queue;
   (h) when the depth pointer of the logical queue exceeds the reserved threshold:
   (i) determining if a shared depth pointer of the partition is less than a maximum shared depth;
   (j) when the shared depth pointer is not less than the maximum shared depth, discarding the data cell; and
   (k) when the shared depth pointer is less than the maximum shared depth:
      storing the data cell in the shared portion of the partition;
      incrementing the depth pointer of the logical queue; and
      incrementing the shared depth pointer of the partition.

2. The method of claim 1, wherein step (g) further comprises:
   when the depth pointer does not exceed the reserved threshold:
      determining if a reserved depth pointer of the partition is less than a maximum reserved depth;
      when the reserved depth pointer of the partition is less than the maximum reserved depth:
         storing the data cell in the reserved portion of the partition;
         incrementing the depth pointer of the logical queue; and
         incrementing the reserved depth pointer of the partition;
      when the reserved depth pointer is not less than the maximum reserved depth, discarding the data cell.

3. The method of claim 1, wherein step (g) further comprises:
   when the depth pointer does not exceed the reserved threshold:
      determining if the data cell is discard enabled;
      when the data cell is discard enabled:
         determining if the depth pointer exceeds a discard threshold of the logical queue;
         when the depth pointer does not exceed the discard threshold:
            storing the data cell in a reserved portion of the partition; and
            incrementing the depth pointer of the logical queue;
         when the depth pointer exceeds the discard threshold, discarding the data cell; when the data cell is not discard enabled:
            storing the data cell in a reserved portion of the partition; and
            incrementing the depth pointer of the logical queue.

4. The method of claim 1, wherein step (k) further comprises:
when the shared depth pointer is less than the maximum shared depth:
determining if the data cell is discard enabled;
when the data cell is not discard enabled:
storing the data cell in the shared portion of the partition;
incrementing the depth pointer of the logical queue; and
incrementing the shared depth pointer of the partition;
when the data cell is discard enabled:
determining if the depth pointer of the logical queue exceeds a
discard threshold of the logical queue;
when the depth pointer exceeds the discard threshold, discarding the data cell;
when the depth pointer does not exceed the discard threshold of the logical queue:
determining if the shared depth pointer of the of the partition exceeds a shared discard threshold of the partition;
when the shared depth pointer exceeds the shared discard threshold, discarding the data cell;
when the shared depth pointer does not exceed the shared discard threshold:
storing the data cell in the shared portion of the partition;
incrementing the depth pointer of the logical queue; and
incrementing the shared depth pointer of the partition.

5. A method for buffering data cells comprising:
receiving a data cell;
determining a logical queue corresponding to the data cell from a plurality of logical queues, wherein determining the logical queue is based on information in the data cell, wherein the logical queue is used to store data in a partition of a partitioned buffer;
determining if a depth pointer of the logical queue is less than a maximum depth;
when the depth pointer of the logical queue is not less than the maximum depth, discarding the data cell;
when the depth pointer of the logical queue is less than the maximum depth:
determining if the depth pointer of the logical queue exceeds a reserved threshold;
when the depth pointer does not exceed the reserved threshold:
determining if a reserved depth pointer of the partition is less than a maximum reserved depth;
when the reserved depth pointer of the partition is not less than the maximum reserved depth, discarding the data cell;
when the reserved depth pointer of the partition is less than the maximum reserved depth:
deter mining if the data cell is discard enabled;
when the data cell is discard enabled:
determining if the depth pointer exceeds a discard threshold of the logical queue;
when the depth pointer does not exceed the discard threshold:
storing the data cell in the reserved portion of the partition;
incrementing the depth pointer of the logical queue; and
incrementing the reserved depth pointer of the partition;
when the depth pointer exceeds the discard threshold, discarding the data cell;
when the data cell is not discard enabled:
storing the data cell in the reserved portion of the partition;
incrementing the depth pointer of the logical queue; and
incrementing the reserved depth pointer of the partition;
when the depth pointer of the logical queue exceeds the reserved threshold:
determining if a shared depth pointer of the partition is less than a maximum shared depth;
when the shared depth pointer is not less than the maximum shared depth, discarding the data cell; and
when the shared depth pointer is less than the maximum shared depth:
determining if the data cell is discard enabled;
when the data cell is not discard enabled:
storing the data cell in the shared portion of the partition;
incrementing the depth pointer of the logical queue; and
incrementing the shared depth pointer of the partition; when the data cell is discard enabled:
determining if the depth pointer of the logical queue exceeds a discard threshold of the logical queue;
when the depth pointer exceeds the discard threshold, discarding the data cell;
when the depth pointer does not exceed the discard threshold of the logical queue:
determining if the shared depth pointer of the of the partition exceeds a shared discard threshold of the partition;
when the shared depth pointer exceeds the shared discard threshold, discarding the data cell;
when the shared depth pointer does not exceed the shared discard threshold:
storing the data cell in the shared portion of the partition;
incrementing the depth pointer of the logical queue; and
incrementing the shared depth pointer of the partition.

6. The method of claim 5, further comprises:
providing the data cell to an output;
determining if the depth pointer of the logical queue is greater than the reserved threshold;
when the depth pointer is greater than the reserved threshold, decrementing the shared depth pointer of the partition;
when the depth pointer is not greater than the reserved threshold, decrementing the reserved depth pointer of the partition; and
decrementing the depth pointer of the logical queue.

7. A buffer management circuit, comprising:
a buffer, wherein the buffer is partitioned into a plurality of partitions, wherein each partition includes a shared portion, wherein a shared size value indicates the number of data cells that can be stored in the shared portion of each partition, wherein a shared depth pointer indicates the number of data cells currently stored in the shared portion of each partition, wherein when a partition includes a reserved portion, a reserved size value indicates the number of data cells that can be stored in the reserved portion of the partition and a reserved depth pointer indicates the number of data cells currently stored in the reserved portion of the partition; and an array of logical queues operably coupled to the buffer, wherein each logical queue stores data cells in a corresponding partition of the plurality of partitions, wherein more than one logical queue may correspond to a partition, wherein a queue size value indicates the total number of data cells that the logical queue can store, wherein a queue depth pointer indicates the number of data cells currently stored by the logical queue, wherein when a logical queue includes a reserved portion, a queue reserved size value indicates the number of data cells that the logical queue can store in the reserved portion of the partition.

8. The buffer management circuit of claim 7, wherein a shared congestion threshold is used to determine when stored data cells in the shared portion of the buffer exceeds a shared discard threshold level.

9. The buffer management circuit of claim 8, wherein a logical queue congestion threshold is used to determine when the number of data cells currently stored by the logical queue exceeds a queue discard threshold level.

10. The buffer management circuit of claim 9, wherein the shared size values, the shared depth pointers, the reserved size values, the reserved depth pointers, the queue size value, the queue depth pointers, the queue reserved size values, the shared discard threshold levels, and the queue discard threshold levels for the array of logical queues and the plurality of partitions are maintained by software.

11. The buffer management circuit of claim 10 further comprises a processor that enqueues data cells into the array of logical queues based on a portion of each data cell that selects a corresponding logical queue of the array of logical queues for each data cell, and the shared size values, the shared depth pointers, the reserved size values, the reserved depth pointers, the queue size value, the queue depth pointers, the queue reserved size value, the shared discard threshold level, and the queue discard threshold levels of the corresponding logical queue and a partition of the plurality of partitions in which the corresponding logical queue stores data cells.

12. The buffer management circuit of claim 11 further comprises an arbiter operably coupled to the processor, wherein the processor dequeues data cells from the array of logical queues based on arbitration information received from the arbiter, wherein dequeuing data cells includes updating pointers corresponding to a logical queues and partitions from which the data cells are dequeued.

13. The buffer management circuit of claim 12, wherein data cells to be enqueued are received by the buffer management circuit from a first set of line cards of a communications switch, wherein data cells which are dequeued are provided to a at least one line card of second set of line cards of the communications switch.

14. The buffer management circuit of claim 13, wherein the communications switch is a cell based communications switch.

15. The buffer management circuit of claim 13, wherein the communications switch is a packet based communications switch.

16. The buffer management circuit of claim 15, wherein the communications switch is an asynchronous transfer mode switch.

17. A buffer maintenance processor, comprising:

a processing module; and memory operably coupled to the processing module, wherein the memory includes operating instruction that cause the processing module to:

determine a logical queue corresponding to a received data cell from a plurality of logical queues, wherein determining the logical queue is based on information in the data cell, wherein the logical queue is used to store data in a partition of a partitioned buffer;

determine if a depth pointer of the logical queue is less than a maximum depth;

when the depth pointer of the logical queue is not less than the maximum depth, discard the data cell;

when the depth pointer of the logical queue is less than the maximum depth:

determine if the depth pointer of the logical queue exceeds a reserved threshold;

when the depth pointer does not exceed the reserved threshold:

determine if a reserved depth pointer of the partition is less than a maximum reserved depth;

when the reserved depth pointer of the partition is not less than the maximum reserved depth, discard the data cell;

when the reserved depth pointer of the partition is less than the maximum reserved depth:

determine if the data cell is discard enabled;

when the data cell is discard enabled:

determine if the depth pointer exceeds a discard threshold of the logical queue;

when the depth pointer does not exceed the discard threshold:

store the data cell in the reserved portion of the partition;

increment the depth pointer of the logical queue; and increment the reserved depth pointer of the partition;

when the depth pointer exceeds the discard threshold, discard the data cell;

when the data cell is not discard enabled:

store the data cell in the reserved portion of the partition;

increment the depth pointer of the logical queue; and increment the reserved depth pointer of the partition;

when the depth pointer of the logical queue exceeds the reserved threshold:

determine if a shared depth pointer of the partition is less than a maximum shared depth;

when the shared depth pointer is not less than the maximum shared depth, discard the data cell; and when the shared depth pointer is less than the maximum shared depth:

determine if the data cell is discard enabled;

when the data cell is not discard enabled:

store the data cell in the shared portion of the partition;

increment the depth pointer of the logical queue; and increment the shared depth pointer of the partition;

when the data cell is discard enabled:

determine if the depth pointer of the logical queue exceeds a discard threshold of the logical queue;

when the depth pointer exceeds the discard threshold, discard the data cell;

when the depth pointer does not exceed the discard threshold of the logical queue:
  determine if the shared depth pointer of the of the partition exceeds a shared discard threshold of the partition;
  when the shared depth pointer exceeds the shared discard threshold, discard the data cell;
  when the shared depth pointer does not exceed the shared discard threshold:
    store the data cell in the shared portion of the partition;
    increment the depth pointer of the logical queue; and
    increment the shared depth pointer of the partition.

18. The buffer maintenance processor of claim 17 further comprises operating instructions stored in the memory that cause the processing module to:

provide the data cell to an output;

determine if the depth pointer of the logical queue is greater than the reserved threshold;

when the depth pointer is greater than the reserved threshold, decrement the shared depth pointer of the partition;

when the depth pointer is not greater than the reserved threshold, decrement the reserved depth pointer of the partition; and decrement the depth pointer of the logical queue.

* * * * *